United States Patent [19]

Loren

[11] Patent Number: 5,100,187

[45] Date of Patent: * Mar. 31, 1992

[54] VEHICLE BUMPER

[75] Inventor: Norman S. Loren, Warren, Mich.

[73] Assignee: Milad Limited Partnership, Naples, Fla.

[*] Notice: The portion of the term of this patent subsequent to Jul. 17, 2007 has been disclaimed.

[21] Appl. No.: 486,524

[22] Filed: Feb. 28, 1990

Related U.S. Application Data

[63] Continuation of Ser. No. 138,060, Dec. 28, 1987, Pat. No. 4,941,701.

[51] Int. Cl.⁵ .............................................. B60R 19/20
[52] U.S. Cl. .................................... 293/110; 293/122; 267/139; 264/572
[58] Field of Search ............... 293/102, 109, 110, 120, 293/122, 136, 155; 267/139, 140; 264/572

[56] References Cited

U.S. PATENT DOCUMENTS

| | | | |
|---|---|---|---|
| 3,843,475 | 10/1974 | Kent | 293/120 X |
| 4,208,069 | 6/1980 | Huber et al. | 293/102 |
| 4,320,913 | 3/1982 | Kuroda | 293/120 |
| 4,385,779 | 5/1983 | Kimura et al. | 293/102 |
| 4,533,166 | 8/1985 | Stokes | 293/120 |
| 4,586,738 | 5/1986 | Butler et al. | 293/122 X |
| 4,749,613 | 6/1988 | Yamada et al. | 428/287 X |
| 4,762,352 | 8/1988 | Enomoto | 293/120 |
| 4,824,732 | 4/1989 | Hendry et al. | 264/572 X |
| 4,904,008 | 2/1990 | Glance | 293/102 X |
| 4,941,701 | 7/1990 | Loren | 293/109 X |

FOREIGN PATENT DOCUMENTS

| | | | |
|---|---|---|---|
| 0170335 | 2/1986 | European Pat. Off. | 293/110 |
| 2711277 | 11/1977 | Fed. Rep. of Germany | 293/110 |
| 118548 | 7/1984 | Japan | 296/121 |

OTHER PUBLICATIONS

Cinpres brochure, received Aug. 1, 1985.

*Primary Examiner*—Dennis H. Pedder
*Attorney, Agent, or Firm*—Brooks & Kushman

[57] ABSTRACT

An impact energy managing bumper structure having a configuration and component members that cooperatively provide, as a function of position along its length, predetermined levels of resilient opposition to deformation and displacement. A semirigid resilient fascia is spaced forwardly of the bumper structure, and the volume defined therebetween is filled with an integral skin urethane foam that is resiliently deformable and integrally bonded to both members.

14 Claims, 6 Drawing Sheets

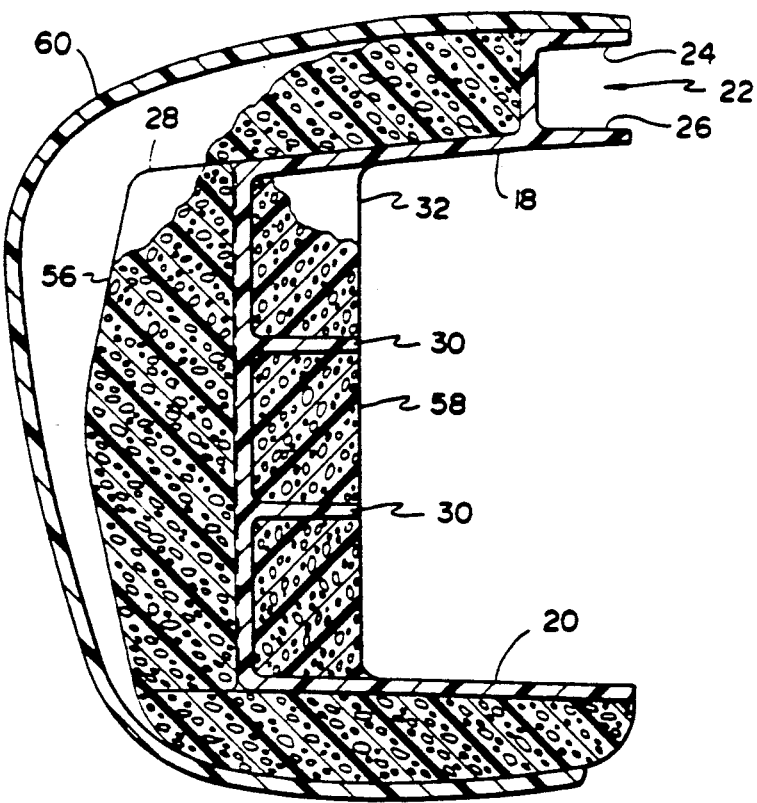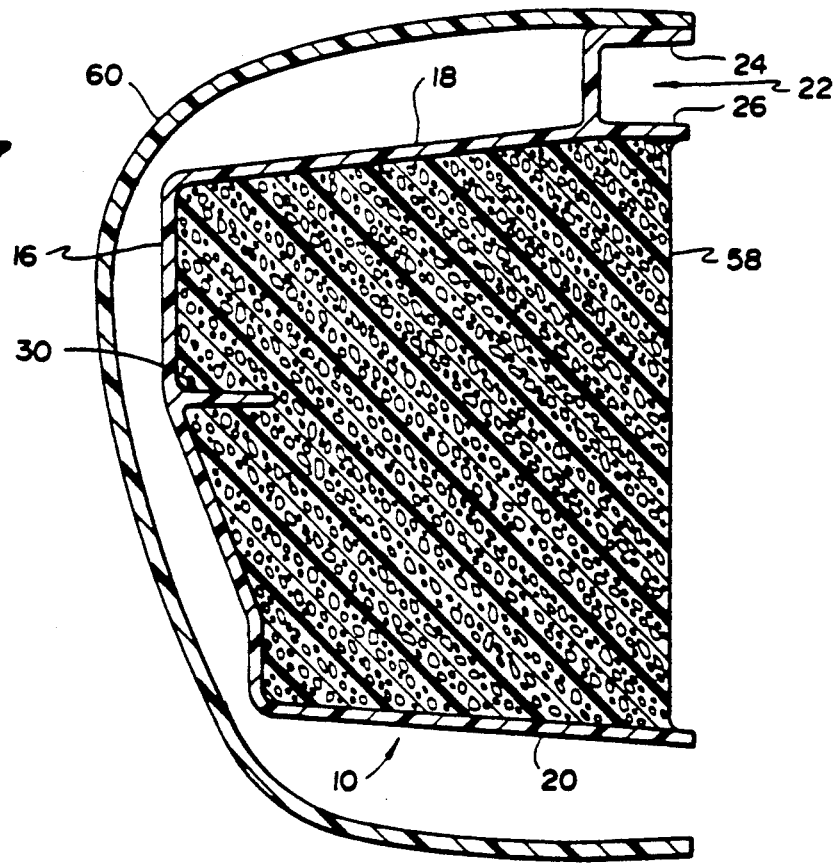

VEHICLE BUMPER

CROSS REFERENCE TO A RELATED APPLICATION

This application is a continuation of formerly copending application Ser. No. 07/138,060, which was filed on Dec. 28, 1987 and which subsequently issued as U.S. Pat. No. 4,941,701 on July 17, 1990.

TECHNICAL BACKGROUND

This invention relates to an impact energy managing bumper structure for vehicles.

BACKGROUND ART

A number of vehicle bumpers have been designed for the purpose of managing moderate impact forces without incurring damage to the bumper or to the vehicle to which it is attached One approach has been to use plastic bumper members having a greater thickness at their centers and ends to provide added rigidity to areas where impact forces would most likely tend to displace them. Another approach has been to use plastic bumper members having ribs and multicellular energy managing material. Yet another approach has been to mount bumpers to vehicles with shock absorbers or with impact-displacing, corrugated or staggered supports See, for example, U.S. Pat. Nos. 2,320,835; 3,866,963; 3.933,387; 4,061,384; 4,070,052; 4,208,069; 4,328,986; 4,385,779; 4,386,799; 4,533,166; 4,586,177; 4,586,739; 4,586,866; and 4,586,984.

The present invention comprises an effective combination of elements that at once minimize the weight and cost of the bumper while maximizing its capacity to prevent damage to the bumper or to the vehicle upon receiving impacts.

DISCLOSURE OF THE INVENTION

In accordance with the present invention, a bumper is provided that is capable of managing moderate impact forces without damage to the bumper or to the vehicle to which it is attached, that can be manufactured and assembled economically, and that is relatively light.

One embodiment of the present invention contemplates an impact energy managing bumper structure having a configuration and component members that cooperatively provide, as a function of position along its length, predetermined levels of resilient opposition to deformation and displacement. Other embodiments contemplate the addition of various means for increasing specific energy managing properties at predetermined points along the length of the bumper structure.

Yet other embodiments contemplate the use of integral skin urethane foam molded in situ between and bonded to the surfaces of particular members of the bumper structure. When these embodiments of the bumper of the present invention receive impact forces, specific structure component members and specific portions of foam are deformed. Resulting tension and compression forces created in the bonded foam inhibit and delay the member deformation and assist in postimpact structural restitution. The cooperative combination of the elements of the bumper structure provide for a progressive deformation of the structure members and thereby significantly enhances its impact energy management capabilities.

Still another embodiment of the present invention contemplates the use of gas assisted injection molding to create channels to reduce stresses introduced during molding processes and to increase the resistance to the deformation and displacement of the bumper structure, thereby contributing to its impact energy management capabilities.

BRIEF DESCRIPTION OF THE DRAWINGS

In the drawings, in which like reference characters indicate corresponding parts in all the views.

Figure 1:
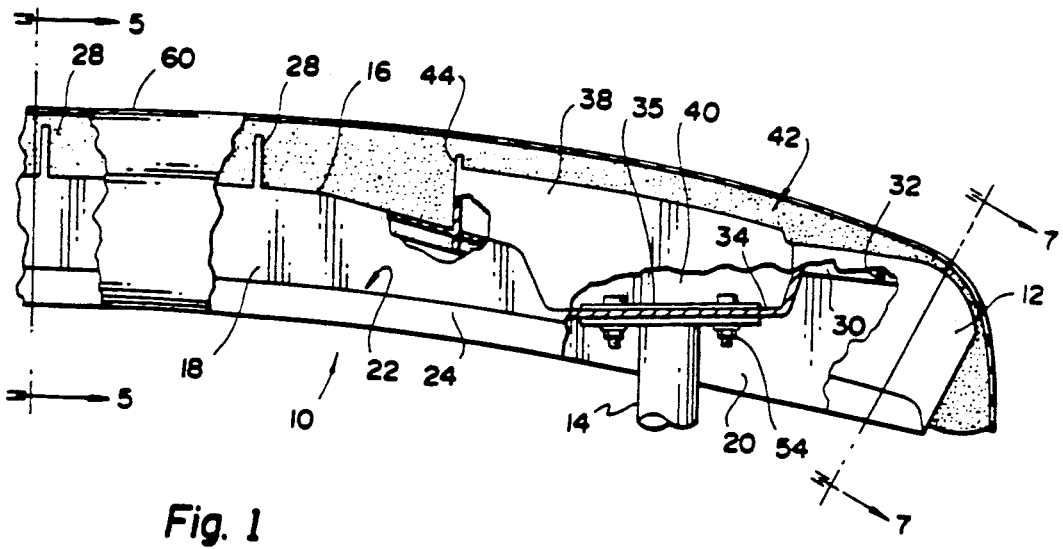
FIG. 1 is a fragmentary plan view, partly broken away and partly in section, of a preferred embodiment of the impact energy managing bumper.
Figure 8:
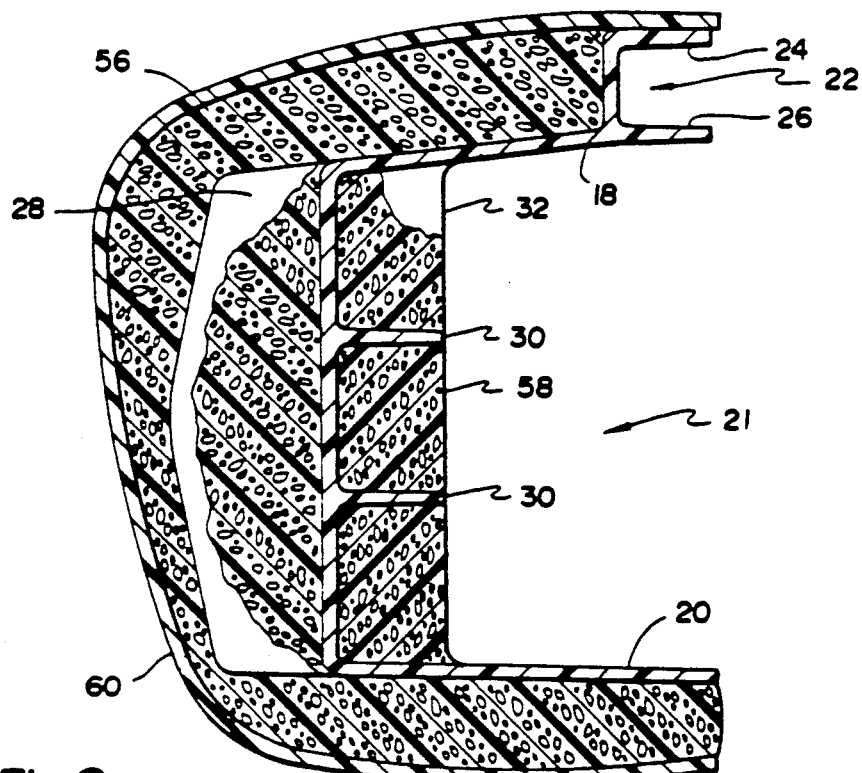
Figure 9:
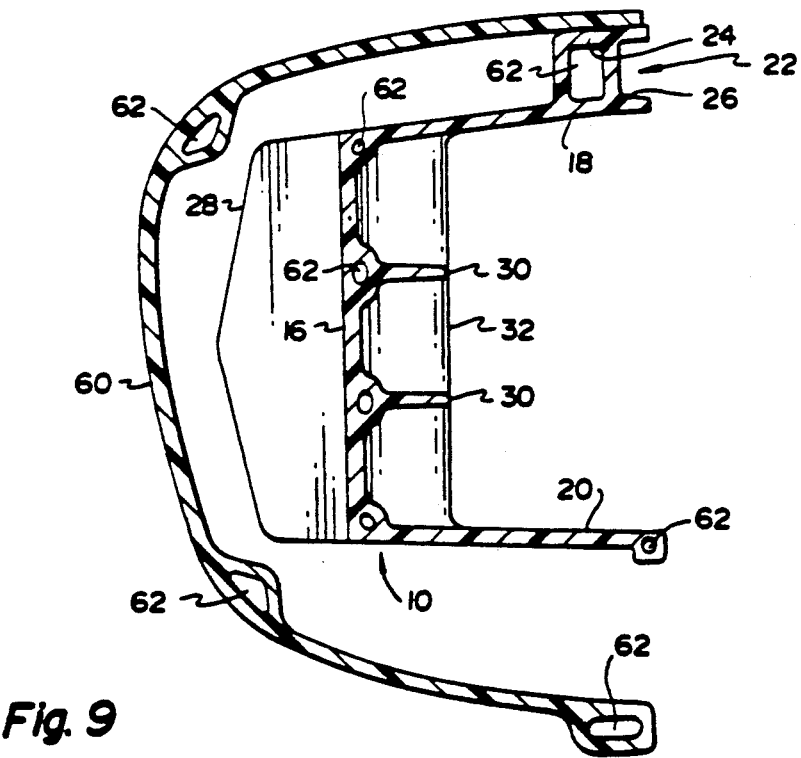

FIG's. 5 and 6 are vertical section views, partly broken away, taken along the line 5—5 of FIG. 1 and illustrating added energy management means;

FIG. 7 is a vertical section view illustrating added energy means and taken along the line 7—7 of FIG. 1;

FIG. 8 is a vertical section view, partly broken away, taken along the line 5—5 of FIG. 1 and illustrating the disposition of energy management means;

FIG. 9 is a vertical section view illustrating an additional embodiment of the bumper structure and taken along the line 5—5 of FIG. 1; and FIG's. 10 through 12 are vertical section views, similar to that of FIG. 9, illustrating additional embodiments of the invention.

DETAILED DESCRIPTION OF PREFERRED EMBODIMENTS OF THE INVENTION

With reference to FIG. 1, shown is an impact energy managing bumper structure having a body 10 secured to a vehicle by, for example, a pair of column rails 14 disposed parallel to and equally spaced from the longitudinal center line of the vehicle. Also shown is a resiliently deformable fascia 60 disposed forward of and substantially enclosing those portions of the body 10 that would otherwise be exposed to view when the bumper structure is mounted.

Figure 2:
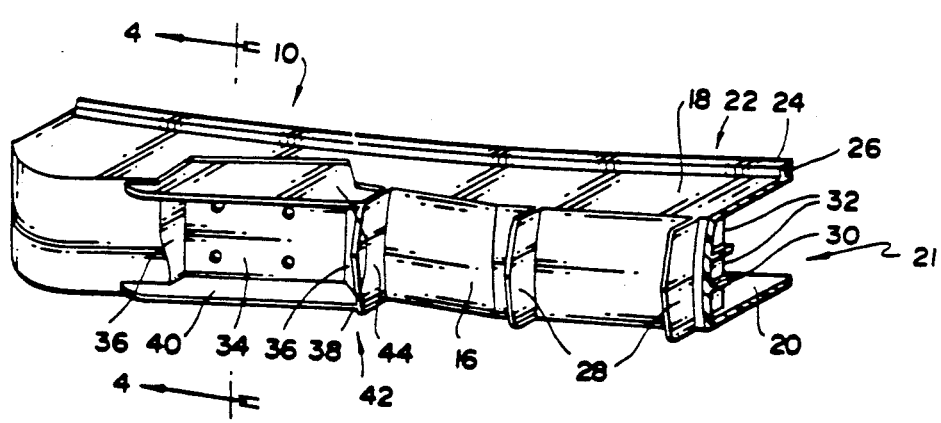
FIG. 2 is a fragmentary perspective view from the front of the bumper structure of FIG. 1.

As shown in FIG. 2, the body 10 includes a beam 12, which may be made of injection molded plastic, having a front portion, or substantially vertical body member 16, an upper flange, or upper substantially horizontal body member, 18, and a lower flange, or lower substantially horizontal body member 20. The upper flange 18 and the lower flange 20 coextend along a substantial length of the front portion 16 and form With it a channel 21 having, generally, a U-shaped cross section, the upper flange 18 and the lower flange 20 each forming an elongate juncture along its line of intersection with the front portion 16. Shown disposed along a substantial portion of the rear edge of the upper flange 18 is an integrally molded channel 22 having, generally, a U-shaped cross section integrally formed of an upper flange 24 and a lower flange 26 The channel 22 is an optional member that may be used to provide increased beam stiffness and to fasten the fascia 60 to the beam 12 as shown in FIG. 8.

Integrally molded with and extending vertically across the front portion 16 of the beam 12 are energy managing, vertical buckling plates, or force distribution members 28, one of which is disposed along a line extending vertically through the center of the beam 12 and the remainder of which are disposed in pairs that are parallel to and equally spaced therefrom.

FIG's. 2 and 3 show that, integrally molded with and extending along a substantial portion of the length of the rear surface of the front portion 16 of the beam 12 are horizontal ribs 30. Integrally molded with the horizontal ribs 30 and with the rear surface of the front portion 16 of the beam 12 are vertical ribs 32, one of which is disposed along a line extending vertically through the center of the beam 12 and the remainder of which are disposed in pairs that are parallel to and equally spaced therefrom; however, the ribs and vertical buckling plates may be arranged in any manner to suit specific requirements. The ribs 32 each form an elongate junction along its lines of intersection with the front portion 16.

Equally spaced from the center of the beam 12 are formed mounting portions 34 for effectively attaching the beam 12 to the column rails 14 shown in FIG. 1. At the outer ends of the mounting portions 34 are vertical members 36. A metal plate 35 may be disposed on the forward surface of the mounting portion 34 to distribute resultant impact forces across the mounting portion 34 and may be used as a tapping plate for fastening. The vertical ribs 32 disposed behind the front portion 16 of the beam 12 and between the mounting portions 34 may be coplanar with the like-positioned vertical bucking plates 28 projecting forwardly from the front portion 16 of the beam 12.

As shown in FIG's. 1 through 3, the mounting portions 34 form, with first and second horizontal buckling plates, or force distribution members, 38 and 40 respectively, channels 42 having, generally, U-shaped cross sections and extending along the beam 12 from vertical members 36 to 44.

With the bumper structure shown in FIG's. 1 through 3, an impact force would be resiliently opposed by reaction forces created as the body 10 resists displacement and deformation. Increasing amounts of impact force would be opposed by similarly increasing reaction forces created as more and more of the body 10 and its component members are displaced and deformed. For example, an impact force applied generally between the mounting portions 34 would be subjected to initial dissipation due to its opposition by compression and tension forces created primarily as the buckling vertical bucking plates 28 resist displacement and deformation. Any remaining impact force would be further dissipated due to its opposition forces created primarily as a result of the compression and tension of the front portion 16, of the flanges 18, 20, 24, and 26, and the ribs 30 and 32 as the body 10 is displaced and deformed.

An impact force applied to the body 10 at a point outwardly disposed from one of the column rails 14 would be dissipated due to its opposition by reaction forces created primarily as a result of the compression and tension of the front portion 16, the flanges 18, 20, 24, and 26, the horizontal buckling plates 38 and 40, the vertical member 36, and the ribs 30 and 32 as the body 10 is displaced and deformed. An impact force applied to the body 10 colinearly with one of the column rails 14 would be dissipated due to its opposition by reaction forces primarily as a result of the compression and tension of the horizontal buckling plates 38 and 40, and the vertical members 36 and 44 as the body 10 is deformed.

Since the body 10 is secured to the column rails 14, it is not free to be displaced with respect thereto by an impact force applied to these areas; and the reaction forces acting to dissipate the impact force are created principally by the component members of the body 10 as they resist compressive deformation. Since the body 10 is free to be displaced by an impact force applied to other areas along its length, reaction forces created as a result of the compression and tension of the component members of the body 10 as it is displaced represent a significant component of the total reaction force acting to dissipate the impact force.

Figure 4:
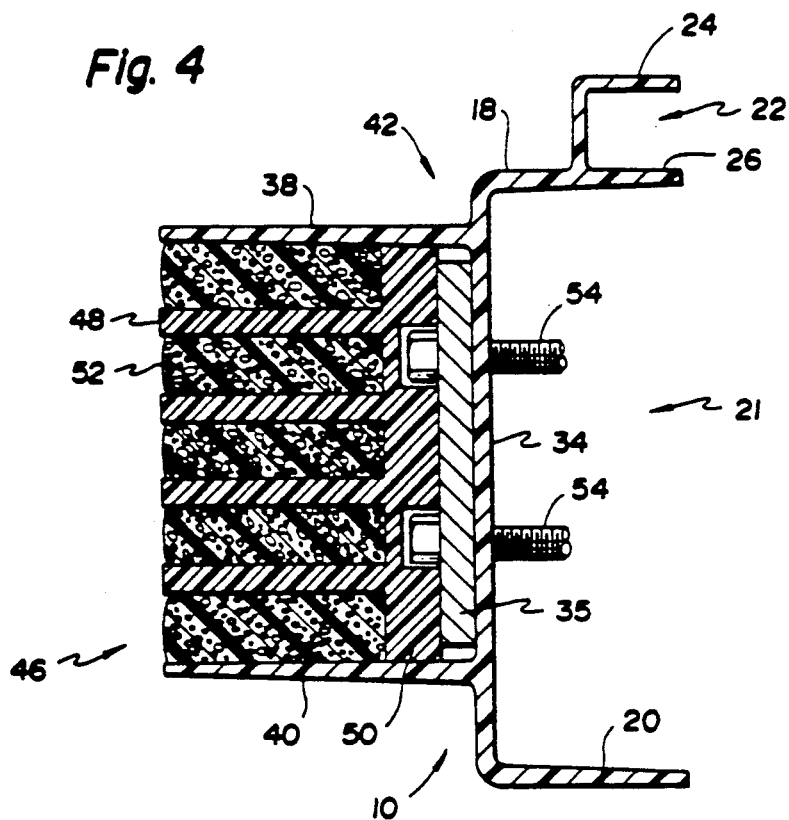
FIG. 4 is a section view taken along line 4—4 of FIG. 2 and illustrating added energy management means.

To dissipate greater impact forces applied colinearly with a column rail 14 (shown in FIG. 1) than can effectively be opposed by reaction forces created by the component members of the body 10, additional energy managing members, or inserts, 46 illustrated in FIG. 4 may be added forward of the mounting portions 34. The inserts 46 may be formed of resilient plastic buckling plates 48 integrally molded to a backing member 50. The buckling plates 48 may be disposed in a number of arrangements to form, for example, parallel slots or honeycomb-shaped chambers. The slots or chambers formed between the buckling plates 48 may be filled with a plastic foam 52 having different resilient properties than those of the buckling plates 48, and the foam 52 may be bonded to the buckling plates 48 and to the backing member 50. Inserts 46 may also be formed entirely of foam that may be bonded to a suitable backing member 50 for support and to facilitate mounting. Any combination of plastic inserts, foam inserts or plastic inserts with foam in situ may be mounted to the bumper structure wherever additional energy managing means are required.

With the body 10 secured to column rails 14 (shown in FIG. 1) as with mounting bolts 54, an impact force applied to the body 10 colinearly with a column rail would be opposed by reaction forces created as the insert 46 and the body 10 resist deformation. In addition to the reaction forces created primarily as a result of the compression and tension of the horizontal buckling plates 38 and 40, and the vertical members 36 and 44 of the body 10, other reaction forces are created as a result of the compression and tension of the buckling plates 48 and foam 52. If the foam 52 is bonded to the insert buckling plates 48, as the former is compressed by the impact force, larger portions of it will be placed in tension and compression, significantly delaying the deformation of the insert buckling plates 48 and thereby providing additional reaction forces to contribute to dissipating the impact force. The foam 52 will also assist the buckling plate 48 in recovering their pre-impact shapes.

Figure 5:
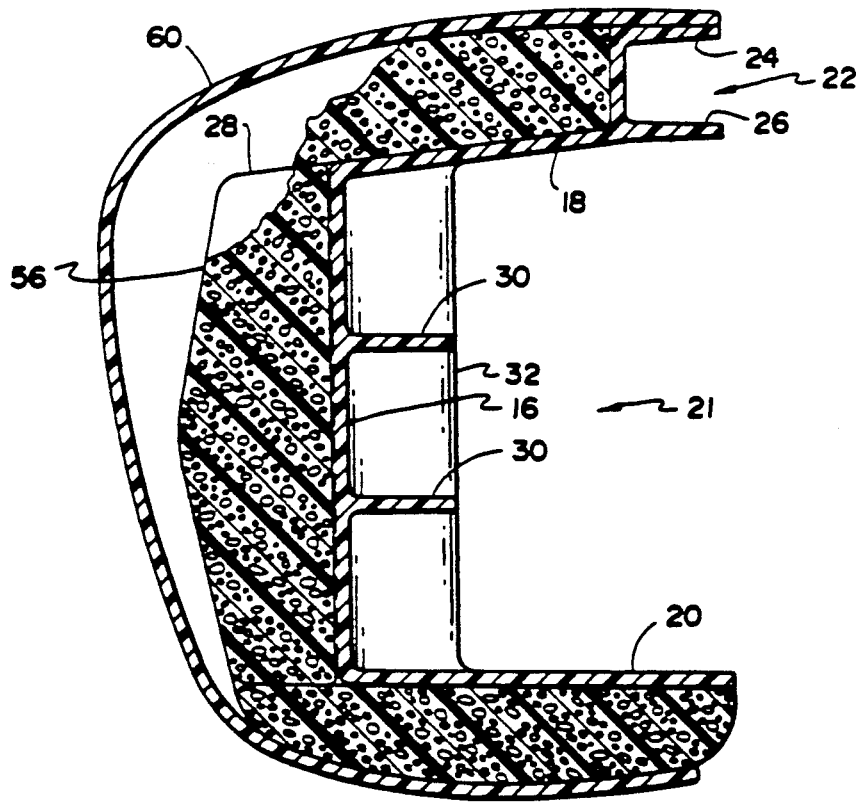

To dissipate greater impact forces applied along the length of the body 10 at points between the mounting portions 34 (shown in FIG's. 1 through 4) than can effectively be opposed by reaction forces created by the component members of the body 10, additional energy managing material, such as plastic foam, 56 illustrated in FIG. 5 may be added forward of the front portion 16 of the beam 12 and between the vertical buckling plates 28 and the vertical members 44. The foam 56 may be self-skinning and have different resilient properties than those of the vertical buckling plates 28, and it may be bonded to the buckling columns 28 and the vertical members 44 and to the forward surface of the front portion 16 of the beam 12. This foam may also be added within and outboard of the mounting portions 34.

An impact force applied generally between the mounting portions 34 (shown in FIG's. 1 through 4)

would be subjected to dissipation, similar to that previously described, due to its opposition by compression and tension forces created as the body 10 and its component members are displaced and deformed More of the impact force is dissipated by reaction forces created as the foam 56 is stretched and compressed. If the foam 56 is bonded to the vertical buckling plates 28 and the vertical members 44 and to the front portion 16, as the former is deformed by the impact force, substantial portions of the foam 56 will be placed in tension and compression, significantly delaying the deformation of the members and thereby providing additional reaction forces to contribute to dissipating the impact force. The foam 56 will also assist the vertical buckling plates 28 and other energy managing members in recovering their pre-impact shapes.

As shown in FIG. 6, plastic foam 58 may also be added behind the front portion 16 of the beam 12 between the horizontal and vertical ribs 30 and 32 respectively. As before, the foam 58 may be self-skinning and have different resilient properties than those of the ribs 30 and 32; and it may be bonded to the rear surface of the front portion 16, to the ribs 30 and 32, and to the upper and lower flanges 18 and 20 respectively. The foam may also be extended rearwardly to fill a substantially greater portion of the channel 21.

With such an arrangement, an impact force applied generally between the mounting portions 34 (shown in FIG's. 1 through 4) would be subjected to dissipation similar to that previously described; but substantially greater tension and compression forces would be created in the foam 58 as it significantly delays the deformation of the various component members of the body 10, particularly the upper and lower flanges 18 and 20 respectively and thereby provides additional reaction forces to contribute to dissipating the impact force. The foam 58 will also assist the flanges 18 and 20 and other energy managing members in recovering their pre-impact shapes.

Figure 3:
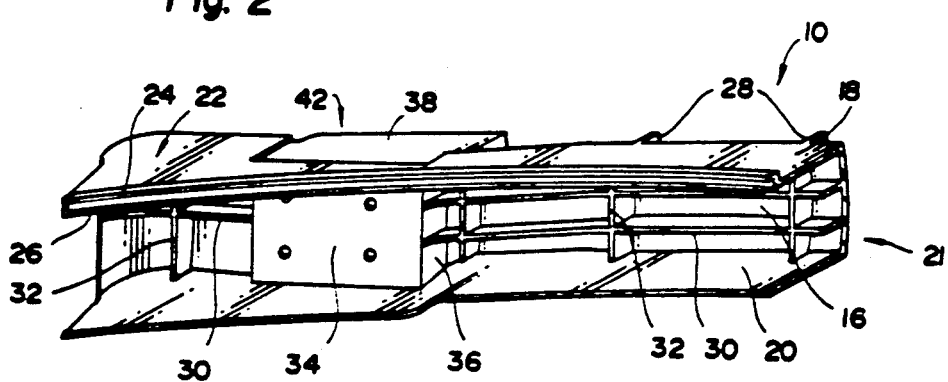
FIG. 3 is a fragmentary perspective view from the rear of the bumper structure of FIG. 1.

As shown in FIG. 7, plastic foam 58 may also be added behind the front portion 16, of the beam 12, that is outwardly disposed from one of the mounting portions 34 (shown in FIG's. 1 through 4) and between the horizontal and vertical ribs 30 and 32 (shown in FIG. 3) and the upper and lower flanges 18 and 20 respectively. The foam 58 may be bonded to the surfaces of these members and may also be extended rearwardly to fill a substantially greater portion of the channel 21.

The dissipation of an impact force applied to a point on the body 10 outwardly disposed from the mounting members 34 would be substantially as described for a force applied generally therebetween.

As shown in FIG's. and 8, a resiliently deformable fascia member 60 may be added forward of the body 10. As also shown in FIG. 8, plastic foam 56 may be disposed between the fascia 60 and the body 10. The foam 56 may be molded in situ by positioning the fascia 60 and the body 10, which extends substantially the full length of the fascia 60, in the desired spaced relationship and introducing the foam 56 into at least a portion of the volume defined therebetween.

Foam surfaces not bounded by the fascia 60 and the body lo are bounded by core pieces having shapes selected to provide the desired configuration of the exposed foam. The core pieces may be pretreated with mold release materials; and the volume-defining surfaces of the fascia 60 and the body 10 may be prepared to enhance bonding by, depending on the materials selected, adhesive application, flame treatment, priming or the like. A formable plastic, preferably a resiliently flexible urethane foam that cures with a resiliently compressible core and an integral skin that tenaciously bonds to the surfaces of the fascia 60 and the body 10, may be introduced into the defined volume and allowed to expand and cure to a semirigid state of desired resilience and compressibility.

An impact force applied to the fascia 60 would be subjected to dissipation, similar to that previously described, arising from its opposition by compression and tension forces created as the body 10 and its component members are displaced and deformed. In this case, the impact force is additionally dissipated by compression and tension forces created as the fascia 60 is displaced and deformed. More of the impact force is dissipated by the reaction forces created as the foam 56 is stretched and compressed. Since the foam 56 is bonded to the surfaces of the fascia 60 and the body 10, as the former is deformed, substantial portions of the foam 56 will be placed in tension and compression, significantly delaying the deformation of the fascia 60 and the body 10 and thereby providing additional reaction forces to contribute to dissipating the impact force. The foam 56 will also assist the fascia 60 and the body 10 and other energy managing members in recovering their pre-impact shapes.

FIG. 9 illustrates how the plastic body 10 and the fascia 60 may be molded with hollow portions 62 to substantially reduce in-molded stresses, which often cause deformation and structural weakness, introduced during their manufacture. After molten plastic has been introduced into a mold and begins to cool, it hardens from its outer surface inwardly. Gas injected at appropriate points into the plastic at this time will expand into the warmer, softer central areas, pressing the plastic outwardly against the mold and creating hollow portions 62 in the plastic. In addition to reducing the stresses introduced during a molding process, the hollow portions 62 also increase the strength of the body 10 and the fascia 60 and increase their resistance to deformation and displacement, thereby contributing to their ability to dissipate impact forces.

When a large part is injection molded, multiple gating is usually required to fill the mold; and high injection pressures are usually required to properly form the part. Multiple gating results in knit lines, which are structurally weak, being created as multiple flows of resin join. This can adversely affect the resilient performances of the structural members when the latter are subjected to progressively increasing impact forces. These undesirable knit lines can be eliminated by using gas assisted injection molding because only one gate need be used to fill a mold and form a part.

The cooperative combination of the fascia 60; the buckling plates 28, 38, 40 and 48, the vertical members, the ribs 30 and 32; the foam 52, 56 and 58; and the beam 12 provide for a progressive deformation of the bumper structure, managing impact energy effectively as a function of its amplitude and its point and direction of application, and preventing thereby a premature collapse of that portion of the structure in the immediate area of an impact.

Distributing the forces associated with an impact is particularly important when the impact forces are confined to a small area; and the integrally molded ribs and the foam bonded to the structure members contribute significantly to this distribution. For example, if the bumper structure strikes a relatively narrow object such as a telephone pole, those structure members directly in line with the impact will begin to deform. As the members deform, resulting tension and compression forces will be communicated to physically associated members by the ribs and foam; and the associated members will develop reaction forces that will oppose and dissipate the impact forces and reduce, by an amount proportional to the reaction forces developed, the amount of deformation experienced by the members in line with the impact.

Figure 10:
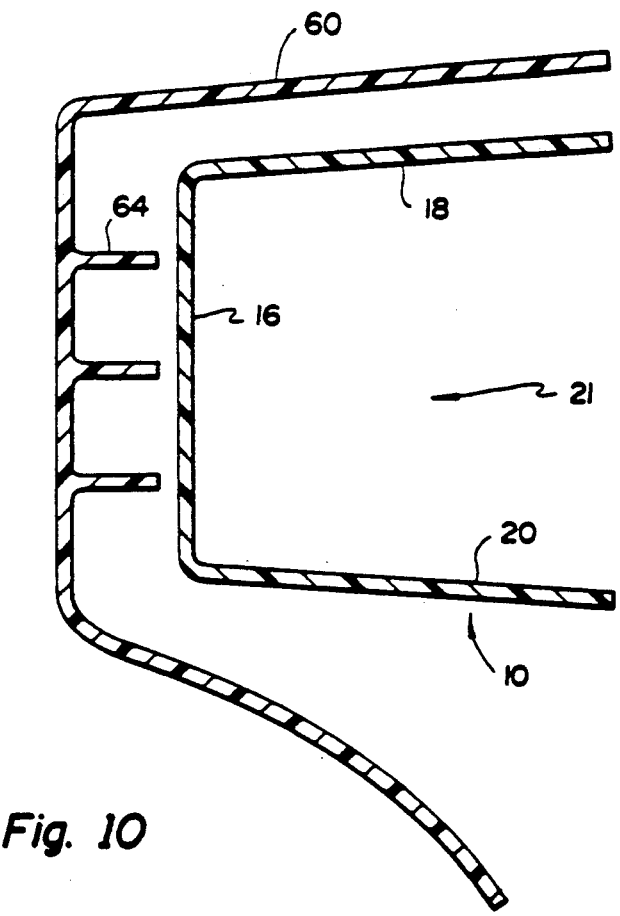

FIG. 10 shows a bumper structure including a body 10 and a fascia 60 relatively disposed as previously described. In this embodiment, the fascia has integrally molded ribs 64 projecting toward the body to provide additional impact energy management.

Figure 11:
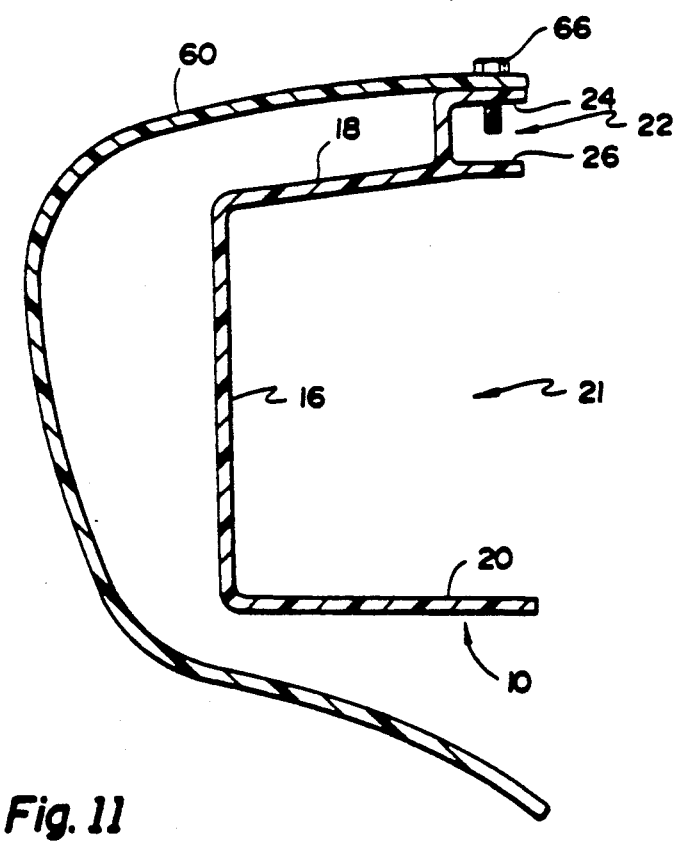

FIG. 11 illustrates a representative means for attaching the fascia 60 to the body 10. The channel 22 formed along the upper rear edge of the body lo is designed to provide increased body stiffness and also to provide a means for securing the fascia 60 to the body 10. As shown, the fascia 60 may be secured to the upper flange 24 of the channel 22 by a screw 66 or the like. The fascia 60 and the body 10 may, of course, also be joined along the upper flange 24 by adhesive means (not shown).

Figure 12:
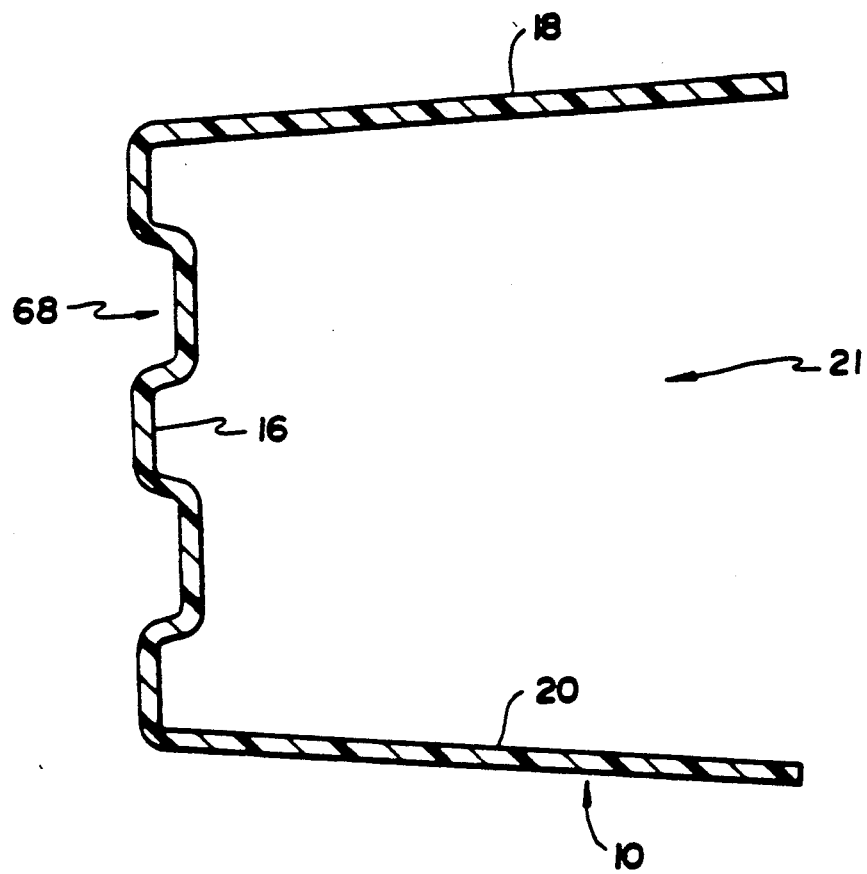

FIG. 12 illustrates another embodiment of the body 10 having a front portion 16, an upper flange 18, and a lower flange 20. The upper flange 18 and the lower flange 20 coextend along a substantial length of the front portion 16 and form with it a channel 21 having, generally, a U-shaped cross section. The front portion 16 of the body 10 is provided with corrugations 68 to effectively increase the stiffness of the body 10 by predetermined amounts.

What is claimed is:

1. A bumper beam for use as the principal energy management member providing resilient opposition to flexing and deformation in a vehicle bumper in response to impact forces and adapted to mount to a vehicle at a pair of mounting points (14) spaced from the longitudinal center line of the vehicle, the beam comprising:

an integrally molded, one-piece, elongated, flexible and deformable plastic body (10) defined by a plurality of substantially horizontal body members (18 and 20) joined by at least one substantially vertical body member (16) as a channel shape generally open toward the mounting points, at least one of the plurality of substantially horizontal body members being an upper substantially horizontal body member (18) and one of the plurality of substantially horizontal body members being a lower substantially horizontal body member (20), and a pair of mounting surfaces (34) formed as recesses in the at least one substantially vertical body member in alignment with the mounting points and forming with the vertical body member a channel generally open in opposite direction to the mounting points for resilient opposition to the flexing and deformation in response to the impact forces, whereby to dissipate such impact forces; and wherein at least one of the body members defines at least one elongate hollow portion (62) sufficiently enclosed and positioned within the at least one body member as the plastic body is integrally molded to contribute to the resilient opposition to the flexing and deformation in response to impact forces, whereby to further dissipate such impact forces.

2. The bumper beam as defined by claim 1, wherein:

the upper and lower substantially horizontal body members respectively form upper and lower elongate junctures with the at least one substantially vertical body member;

the upper and the lower substantially horizontal body members respectively have distal edges extending generally parallel to their respective elongate junctures with the at least one substantially vertical body member; and the at least one elongate hollow portion is disposed proximate to and extends substantially along a significant portion of the distal edge of at least one of the substantially horizontal body members.

3. The bumper beam as defined by claim 1, wherein;

the upper and lower substantially horizontal body members respectively form upper and lower elongate junctures with the at least one substantially vertical body member;

the upper and the lower substantially horizontal body member respectively have distal edges extending generally parallel to their respective elongate junctures with the at least one substantially vertical body member;

the at least one elongate hollow portion is disposed proximate to and extends substantially along a significant portion of the distal edge of at least one of the substantially horizontal body members; and at least one additional elongate hollow portion is defined substantially enclosed within a significant portion of at least one said elongate juncture.

4. The bumper beam as defined by claim 2 or 3, wherein each force distribution member comprises a buckling plate.

5. The bumper beam defined by claim 4, wherein each mounting surface has first and second force distribution members.

6. The bumper beam as defined by claim 3, further including integral ribs formed on the body at selected positions to assist in management of impact forces.

7. The bumper beam as defined by claim 6, wherein:

each of the integral ribs forms an elongate juncture with the at least one substantially vertical body member; and at least one further elongate hollow portion is defined substantially enclosed within a significant portion of at least one said elongate juncture of the integral ribs.

8. The bumper beam as defined by claim 2, wherein the at least one hollow portion is formed using a gas-assisted injection molding process whereby gas is injected into injected molten plastic material used to form the body.

9. The bumper beam as defined by claim 2 or 3, wherein the body has an end portion at each end thereof and a center portion disposed therebetween and has a substantially arcuate shape in plan view with the center portion projecting outwardmost from the vehicle.

10. The bumper beam as defined by claim 3, further including integral ribs formed on the body at selected positions to assist in management of impact forces.

11. The bumper beam as defined by claim 10, wherein:

each of the integral ribs forms an elongate juncture with the at least one substantially vertical body member; and at least one further elongate hollow portion is defined substantially enclosed within a significant portion of at least one said elongate juncture of the integral ribs.

12. The bumper beam as defined by claim 11, wherein the at least one elongate hollow portion, the at least one additional elongate hollow portion and the at least one further elongate hollow portion are formed as the body members are integrally molded by gas injected into injected molten plastic material used to mold the body members.

13. A bumper beam for use as the principal energy management member providing resilient opposition to flexing and deformation in a vehicle bumper in response to impact forces and adapted to mount to a vehicle at a pair of mounting points (14) spaced from the longitudinal center line of the vehicle, the beam comprising:

an integrally molded, one-piece, elongated, flexible and deformable plastic body (10) defined by a plurality of substantially horizontal body members (18 and 20) joined by at least one substantially vertical body member (16) as a channel shape generally open toward the mounting point, at least one of the plurality of substantially horizontal body members being an upper substantially horizontal body member (18) and one of the plurality of substantially horizontal body members being a lower substantially horizontal body member (20), and a pair of mounting surfaces (34) formed as recesses in the at least one substantially vertical body member in alignment with the mounting points and forming with the vertical body member a channel generally upon in opposite direction to the mounting points; and force distribution members at least partially defining the recesses and in resilient opposition to the flexing and deformation in response to impact forces, whereby to dissipate such impact forces.

14. The bumper beam as defined by claim 13, wherein at least one of the body members defines at least one elongate hollow portion (62) sufficiently enclosed and positioned within said at least one body member as the plastic body is integrally molded to contribute to the resilient opposition to the flexing and deformation in response to impact forces, whereby to further dissipate such impact forces.

* * * * *